000
United States Patent Office 3,009,922
Patented Nov. 21, 1961

3,009,922
PROCESS FOR OBTAINING D(—)-α-HYDROXY-β,β-DIMETHYL-γ-BUTYROLACTONE
Howard C. Klein, Brooklyn, N.Y., and Roland Kapp, East Orange, and Richard Griffith, Middletown, N.J., assignors to Nopco Chemical Company, Harrison, N.J., a corporation of New Jersey
No Drawing. Filed June 19, 1958, Ser. No. 742,979
10 Claims. (Cl. 260—343.6)

The present invention relates to a process for obtaining directly D(—)-α-hydroxy-β,β-dimethyl-γ-butyrolactone from a racemic mixture of α,γ-dihydroxy-β,β-dimethyl butyramide.

The material α,γ-dihydroxy-β,β-dimethyl butyramide also known as pentamide is of great utility in the preparation of pantothenic acid as well as derivatives thereof e.g., calcium pantothenate. One of the procedures which utilizes the amide has been to first prepare α-hydroxy-β,β-dimethyl-γ-butyrolactone also known as pantolactone and convert it to pantamide by treatment with ammonia. Subsequently the pantamide is reconverted to the lactone. Such procedure is carried out in order to purify the lactone. Additionally, since the pantothenic acid or derivatives thereof which would be obtained from the L(+)-pantolactone has no physiological activity, it is necessary during the process for the preparation of pantothenic acid to resolve the lactone to obtain the desired D(—) optical isomer. This heretofore has been accomplished by treating racemic pantolactone with l-brucine. The D(—)-isomer of the lactone is recovered as the brucine complex which by subsequent treatment with a base followed by relactonization with an acid, frees the D(—)-isomer.

Accordingly, it is an object of the present invention to obtain D(—)-α-hydroxy-β,β-dimethyl-γ-butyrolactone in an improved and more direct manner than has been heretofore accomplished. It is a further object to prepare D(—)-pantolactone in higher purity and larger yields when compared with the prior art procedures. Further objects will become apparent from the detailed description given hereinafter. It is intended, however, that the detailed description and the specific examples do not limit the invention, but merely indicate the preferred embodiments thereof since various changes and modifications within the scope of the invention will become apparent to those skilled in the art.

The above and other objects have been unexpectedly accomplished in the following manner. Racemic pantamide in an inert solvent, preferably methanol, is treated with l-brucine at elevated temperatures. There is formed as reaction products a complex of D(—)-pantolactone and l-brucine and a complex of L(+)-pantolactone and l-brucine. Because of the difference in solubilities of these two complexes, the former may be precipitated from solution while the latter remains in solution. In this manner the complex of D(—)-pantolactone and l-brucine is recovered from which free D(—)-pantolactone may be obtained by treatment with a base followed by relactonization with an acid. The D(—)-pantolactone is obtained in excellent yields and high purity. Thus by following the teachings of this invention, highly useful D(—)-pantolactone optical isomer is obtained directly from a racemic mixture of the pantamide without in any manner converting the pantamide to the lactone.

It is known to resolve a racemic mixture of pantolactone with brucine. However, resolution of racemic pantamide with brucine has been found to be a far superior process. It might be thought that under the conditions of reaction, the pantamide is first converted to pantolactone which is subsequently resolved with brucine. However, it has been found that when racemic pantamide is refluxed in methanol, the quantity of pantamide that is decomposed to the pantolactone is far too small to confirm such a theory and to explain our high yields of the complex of D(—)-pantolactone and l-brucine. In other words, our process in which racemic pantamide is directly resolved with l-brucine to yield D(—)-pantolactone in high yields and high purity was most unexpected.

The racemic pantamide and l-brucine when reacted to form a complex are present in a mol ratio of from about 0.5 to 0.55 mols of l-brucine per mol of racemic pantamide. As pointed out heretofore, the complex of L(+)-pantolactone and l-brucine remains in solution due to its increased solubility in the reaction mixture. This particular complex is not utilized since the l-pantothenic acid or derivative thereof obtained from the L(+)-pantolactone has no physiological activity. Hence it is preferable to employ a mol ratio of not more than about 0.55 mol of l-brucine per mol of racemic pantamide. In other words, there is no need for introducing l-brucine into the reaction mixture in an amount in excess of that required to react with the D(+)-pantamide. However, a 5% to 10% excess of l-brucine, based on the weight of racemic pantamide is preferably used. Although reaction is preferably brought about at the reflux temperature of the reaction mixture, other temperatures from about 40° C. up to the reflux temperature may be used. Of course, the lower the temperature, the longer the reaction time will be. Generally, the reaction time will be from 5 hours to 5 days. At reflux temperature, a preferred reaction time of about 20 to 25 hours is used. The selection of a solvent may be made from any number of liquid organic materials which are inert with respect to the reactants. The pantamide and l-brucine may be dissolved or suspended in the solvent. Suitable solvents are methanol, isopropanol, chloroform, methylene dichloride, water. The amount of solvent is from about 2.5 to 5 parts per part by weight of l-brucine. Recovery of the D(—)-pantolactone may be accomplished without difficulty. The reaction mixture is cooled down and the complex of brucine and D(—)-pantolactone filtered off. To recover the lactone, the complex is treated with a base whenupon it is broken up to form the D(+)-pantoate salt of the lactone and brucine. The brucine is extracted with a solvent, e.g., chloroform, and the pantoate salt which remains in the aqueous alkaline solution is relactonized with an acid. However, the recovery of the lactone from its brucine complex does not form a part of the present invention and any convenient means available in the art may be used.

For a fuller understanding of the nature and objects of the invention, reference may be made to the following examples which are given merely to illustrate the invention and are not to be construed in a limiting sense. The percent yields where reported take into consideration the fact that one mol of racemic pantamide can be converted only to a maximum of one-half mol of D(—)-pantolactone. For instance, a 100% yield would indicate conversion of one mol of racemic pantamide to one-half mol of D(—)-pantolactone l-brucine complex.

Example I 43.0 grams of l-brucine, 125 ml. of technical grade methanol and 29.4 grams of pure dl-pantamide were admixed and the resulting solution refluxed with stirring on a steam bath. A clear solution was observed. However, after 4½ hours, sandy crystals of the complex of brucine and D(—)-pantolactone were deposited from the refluxing reaction mixture. After a total of 21 hours' reflux time, the reaction mixture was cooled to room temperature and maintained thereat for one hour to allow for precipitation of the l-brucine D(—)-pantolactone complex. Thereafter the granular l-brucine D(−)-pantolactone complex was separated from the mother liquor by filtration. A yield of 42 grams of this complex was obtained having a melting point of 211° to 213° C. D(−)-pantolactone was recovered from the complex in the following manner. The complex was treated with 100 ml. of chloroform and 70 ml. of a 10% by weight aqueous sodium hydroxide solution to break up the complex. The resulting aqueous alkaline phase which contained D(+)-sodium pantoate was separated from the chloroform phase, which contained most of the liberated l-brucine, and re-extracted with five 30 ml. portions of chloroform to remove the balance of the brucine. The aqueous alkaline phase was then made acid to Congo red by addition of aqueous hydrochloric acid and heated for one hour at 90° C. to relactonize the D(+)-sodium pantoate. Upon cooling, the crude D(−)-pantolactone was extracted with isopropyl acetate. After drying with sodium sulfate and evaporation of the isopropyl acetate, 8.5 grams of D(−)-pantolactone were recovered. The specific rotation, $(\alpha)_D^{25}$ was found to be −36.6.

The D(−)-pantolactone may then be reacted with β-alamine, calcium β-alanate, etc., to obtain pantothenic acid, calcium pantothenate or other derivatives of pantothenic acid.

*Example II*

129 grams of l-brucine (0.32 mol), 89.2 grams of dl-pantamide (99.2% purity) which was equivalent to 0.607 mol and 186 ml. of methanol were refluxed together for 21 hours. Thereafter the reaction mixture was filtered while hot. In this manner 118.5 grams of crude l-brucine D(−)-pantolactone complex were obtained having a melting point of 202° to 204° C. This amounted to 74.5% of theory. A second crop of complex was recovered from the mother liquor. This weighed 12.5 grams and melted at 192° to 199° C. The first crop was redigested with 236 ml. of methanol and filtered while hot. 96 grams (60% of theory) of complex melting at 205° to 208° C. was recovered. A second crop from the cooled mother liquor was recovered weighing 10.24 grams (6.4% of theory) and melting at 200° to 206° C. The crude second crop weighing 12.5 grams was redigested with hot methanol. A yield of 5.21 grams melting at 198° to 200° C. was recovered.

*Example III*

The preparation of the l-brucine D(−)-pantolactone complex was repeated according to the procedure of Example II except that 93 ml. of methanol were used instead of 186 ml. Upon completion of reflux the crude complex was filtered while hot. In this manner 159.2 grams of product melting at 203° to 205° C. were recovered. This amounted to 100% of theory. A second crop was recovered from the mother liquor weighing 3.02 grams and melting at 200° to 203° C. The first crop was redigested with 320 ml. of methanol and filtered while hot. 128 grams (80% of theory) were recovered having a melting point of 204° to 207° C. A second crop was recovered from the redigested mother liquor. 16.8 grams (10.5% of theory) melting at 203° to 207° C. were recovered.

*Example IV*

368 grams (2.5 mols) of dl-pantamide, 560 grams l-brucine (1.38 mols) and 375 mols of methanol were refluxed together for 23 hours. The l-brucine D(−)-pantolactone complex was filtered while hot. In this manner, 655 grams (100% of theory) of complex melting at 199° to 204° C. were recovered. The complex was then digested for ½ hour at reflux with 1300 ml. of methanol. Upon filtration while hot, a yield of 589 grams of purified complex was recovered having a melting point of 203° to 208° C. This yield was 90% of theory.

*Example V*

118 grams of dl-pantamide (0.8 mol), 170 grams of l-brucine (0.24 mol), and 125 ml. of methanol were admixed and refluxed together for 16 hours. Thereafter the reaction mixture was cooled to 40° C., centrifuged to remove solvent and washed with methanol and dried. A yield of 195.5 grams (93% of theory) of complex was recovered. Upon redigestion with 1 ml. of methanol per gram of complex, 183 grams (88% of theory) of purified l-brucine D(−)-pantolactone complex melting at 204° to 205° C. was recovered. This material was suspended in 360 ml. of chloroform. 16.6 grams of sodium hydroxide dissolved in 210 ml. of water were then added to the suspension and stirring carried out at room temperature for about 1 hour. Upon cessation of the stirring, separation of the water and chloroform layers occurred. The aqueous layer which contained D(+)-sodium pantoate was extracted four times with 70 ml. portions of chloroform to insure removal of all of the brucine. Thereafter 42 ml. of concentrated hydrochloric acid were added to the aqueous layer to relactonize the D(+)-sodium pantoate. This material was then cooled, saturated with sodium chloride and the D(−)-pantolactone extracted three times with 70 ml. of isopropyl acetate followed by extraction with two 50 ml. portions of isopropyl acetate. Upon evaporation of the solvent, 41.8 grams (80.5% of theory) of crude D(−)-pantolactone was obtained. The lactone was recrystallized from a mixture of 42 ml. of methyl isobutyl ketone and 42 ml. hexane, thereby yielding 27.9 grams of D(−)-pantolactone having a specific rotation of −45.2.

*Example VI*

Example V was repeated. After 48 hours of reflux a yield of crude complex amounting to 202.3 grams (96% of theory) was obtained. This material was redigested with one ml. of methanol per gram of complex. 187.3 grams (89.5% of theory) of purified complex was obtained. The complex was split by treatment with 15.8 grams of 98% aqueous solution of sodium hydroxide in 105 ml. of water and 180 ml. of chloroform. Extraction, re-lactonization and recovery was thereafter carried out as in the preceding example. A crude yield of D(−)-pantolactone weighing 41.1 grams (79% of theory) was obtained. Upon purification, 35 grams (67% of theory) of lactone were obtained having a specific rotation equal to −35.6.

Having thus described our invention what we claim as new and desire to secure by Letters Patent is:

1. A process for obtaining D(−)-α-hydroxy-β,β-dimethyl-γ-butyrolactone from racemic α,γ-dihydroxy-β,β-dimethyl butyramide which comprises the steps of bringing into contact with each other l-brucine and racemic α,γ-dihydroxy-β,β-dimethyl buytramide in an inert solvent selected from the group consisting of lower alkanols, methylene dichloride, chloroform and water, recovering from the resulting reaction mixture a complex of l-brucine-D(−)-α-hydroxy-β,β-dimethyl-γ-butyrolactone and freeing from said complex said D(−)-α-hydroxy-β,β-dimethyl-γ-butyrolactone.

2. A process for obtaining D(−)-α-hydroxy-β,β-dimethyl-γ-butyrolactone from racemic α,γ-dihydroxy-β,β-dimethyl butyramide which comprises the steps of bringing into contact with each other from about 0.5 to 0.55 mol of l-brucine and one mol of racemic α,γ-dihydroxy-β,β-dimethyl butyramide in an inert solvent selected from the group consisting of lower alkanols, methylene dichloride, chloroform and water, recovering from the resulting reaction mixture a complex of l-brucine-D(−)-α-hydroxy-β,β-dimethyl-γ-butyrolactone and freeing from said complex said D(−)-α-hydroxy-β,β-dimethyl-γ-butyrolactone.

3. A process for obtaining D(−)-α-hydroxy-β,β-dimethyl-γ-butyrolactone from racemic α,γ-dihydroxy-β,β-dimethyl butyramide which comprises the steps of bringing into contact with each other about 0.55 mol of l-brucine and one mol of racemic α,γ-dihydroxy-β,β-dimethyl butyramide in methanol, recovering from the resulting reaction mixture a complex of l-brucine-D(—)-α-hydroxy-β,β-dimethyl-γ-butyrolactone and freeing from said complex said D(—)-α-hydroxy-β,β-dimethyl-γbutyrolactone.

4. A process for obtaining D(—)-α-hydroxy-β,β-dimethyl-γ-butyrolactone from racemic α,γ-dihydroxy-β,β-dimethyl butyramide which comprises the steps of bringing into contact with each other from about 0.5 to 0.55 mol of l-brucine and one mol of racemic α,γ-dihydroxy-β,β-dimethyl butyramide in methanol at a temperature of from about 40° C. up to the reflux temperature of the resulting reaction mixture, recovering from the resulting reaction mixture a complex of l-brucine-D(—)-α-hydroxy-β,β-dimethyl-γ-butyrolactone and freeing from said complex said D(—)-α-hydroxy-β,β-dimethyl-γ-butyrolactone.

5. A process for obtaining D(—)-α-hydroxy-β,β-dimethyl-γ-butyrolactone from racemic α,γ-dihydroxy-β,β-dimethyl butyramide which comprises the steps of bringing into contact with each other from about 0.5 to 0.55 mol of l-brucine and one mol of racemic α,γ-dihydroxy-β,β-dimethyl butyramide in methanol at a temperature of from about 40° C. up to the reflux temperature of the resulting reaction mixture for about 5 hours to 5 days, recovering from the resulting reaction mixture a complex of l-brucine-D(—)-α-hydroxy-β,β-dimethyl-γ-butyrolactone and freeing from said complex said D(—)-α-hydroxy-β,β-dimethyl-γ-butyrolactone.

6. The process of claim 5 in which said time is about 20 to 25 hours.

7. The process of claim 6 in which said temperature is the reflux temperature of said reaction mixture.

8. A process for obtaining D(—)-α-hydroxy-β,β-dimethyl-γ-butyrolactone from racemic α,γ-dihydroxy-β,β-dimethyl butyramide which comprises the steps of bringing into contact with each other from about 0.5 to 0.55 mol of l-brucine and one mol of racemic α,γ-dihydroxy-β,β-dimethyl butyramide in methanol at a temperature of from about 40° C. up to the reflux temperature of the resulting reaction mixture, recovering from the reaction mixture a complex of l-brucine-D(—)-α-hydroxy-β,β-dimethyl-γ-butyrolactone, reacting said complex with sodium hydroxide, thereby forming D(+)-sodium pantoate, and treating said D(+)-sodium pantoate with an acid thereby obtaining said D(—)-α-hydroxy-β,β-dimethyl-γ-butyrolactone.

9. The process of claim 8 in which said time is about 20 to 25 hours.

10. The process of claim 9 in which said temperature is the reflux temperature of said reaction mixture.

References Cited in the file of this patent

UNITED STATES PATENTS

| | | |
|---|---|---|
| 2,377,390 | Weijlard et al. | June 5, 1945 |

FOREIGN PATENTS

| | | |
|---|---|---|
| 605,444 | Great Britain | July 23, 1948 |
| 626,498 | Great Britain | July 15, 1949 |